Nov. 4, 1969  HIROSHI CHIKAMASA ET AL  3,476,363
METHOD OF ADDING AND MIXING
Filed Jan. 29, 1968  2 Sheets-Sheet 1

INVENTORS
HIROSHI CHIKAMASA
KOTARO ASO

BY *Sughrue, Rothwell, Mion, Zinn & Macpeak*

ATTORNEYS

INVENTORS
HIROSHI CHIKAMASA
KOTARO ASO

ATTORNEYS

United States Patent Office 3,476,363
Patented Nov. 4, 1969

3,476,363
METHOD OF ADDING AND MIXING
Hiroshi Chikamasa and Kotaro Aso, Kanagawa, Japan, assignors to Fuji Photo Film Co., Ltd., Tokyo, Japan
Filed Jan. 29, 1968, Ser. No. 701,463
Claims priority, application Japan, Jan. 28, 1967, 42/5,522
Int. Cl. B01f *15/00, 3/00*
U.S. Cl. 259—8                              1 Claim

ABSTRACT OF THE DISCLOSURE

A method of manufacturing a mixture semicontinuously so that the time-change in the quality and physical properties thereof may be within allowable limits, with a control tank, two up and down moving measuring cylinders, an overflow level setting pipe connected thereto comprising: measuring and adding the liquids into the mixing tank according to a predetermined order and interval, and mixing the liquids added into the mixing tank by stirring to forward the mixed mixture continuously to the next process stage.

BACKGROUND OF THE INVENTION

Field of the invention

This invention reltes to a method for manufacturing a mixture of various kinds of liquids which easily change their properties with time and in particular, to an improved method of automatically and continuously manufacturing a mixture of added liquid agents or of various kinds of liquids or solutions and colloidal solutions and high polymer solutions, which are dissolved by a proper method in the manufacturing process of the mixture, by adding them in a predetermined addition order and at predetermined addition intervals, wherein the liquids to be mixed are accurately measured in a definite quantity as needed, so that the time from the start of the manufacture to the finishing thereof for use is within the allowable range considering the change in properties of the mixture, with time.

Description of the prior art

In the conventional manufacture of coating solutions for photosensitive materials, some kinds of coating solutions, such as a coating solution for a photosensitive emulsion layer, a coating solution for a protective layer, a coating solution for an anti-halation layer, a coating solution for a subbing layer, are made by a batch manufacturing process wherein the liquid emulsion or gelatin is melted or dissolved in a standard unit of the capacity of the mixing tank used and some addition agents of liquids or solutions are measured to be in definite mixing proportions to the solution of the emulsion or gelatin and are added to the solution in the order in which the addition agents do not affect one another, and are mixed by stirring.

However, in conventional batch manufacturing, there are lots of disadvantages accompanying the process. For example, fluctuations are apt to be made in the physical properties and photographic characteristics to be controlled in the coating solution mixed in the mixing tank, a switch operation is needed for switching the tanks in order to supply the coating compounds continuously to the coating head in the continuous process, the operation quantity is locally concentrated for a large amount of coating solution should be made at a time for the efficiency of production. Moreover, from the start of the mixing of the coating compounds to the use-finishing thereof, the physical properties of the coating compounds to be controlled in the coating process fluctuate and the gelatin in the coating solution coagulates partly, and the addition agents contained in the mixed coating solution affect the photographic characteristics singly or mutually, which greatly affects the manufacture of photosensitive material.

The tendency of fluctuation in properties is remarkably increased with the concentration of the coating solution accompanying the speed up of the coating speed for the purpose of increasing productivity and with the increase of the proportion of silver halide contained in the coating solution accompanying the advance of the property of photosensitive material. Therefore, in the conventional batch manufacturing process it became extremely difficult to eliminate the fluctuation, and the improvement of the batch manufacturing process is required. The above-mentioned disadvantages in the manufacturing process are eliminated by making the manufacturing process completely continuous, but on the other hand the production scale must be taken into consideration as to make little production of many kinds of photosensitive materials, and there are a lot of problems to be solved, such that the kinds and amount of addition agents are various and that high accuracy of quantity of addition agents is needed in the addition process. Moreover, it is desired that the exchange of the addition agent and the regulating of the addition interval or addition order are easily carried out in response to the kinds of the manufactured photosensitive material, the manufacturing apparatus is easily cleaned and reconstructed accompanying the changing of the manufacturing conditions, the operation condition of the manufacturing apparatus quickly gets to a stationary condition, and the measurement of the quantities of addition agents used is easy and accurate. For a continuous process, complicated, expensive apparatus is needed and it must be carefully cared for and treated. Therefore, it is very difficult to accomplish the object effectively by making the manufacturing process continuous on a production scale.

The principal object of the present invention is to provide an automatic and continuous adding and mixing method, for instance for a coating solution of photosensitive material, wherein the liquids to be added and mixed are divided into small quantity mixing units in order not to affect the properties of the liquids to be mixed within the period from the start of the manufacturing to use-finishing and the margin of error in the emulsion-gelatin solution and the addition agents is reduced by being divided into larger quantity units compared to a continuous process.

SUMMARY OF THE INVENTION

We, the inventors, overcame the difficulties in the manufacturing apparatus accompanying the change of process to a continuous process and the troubles in the quality of the products by the method in accordance with the present invention as follows:

(1) Dividing the unit quantity of manufacturing a coating solution into small units as not to affect the quality and the physical properties of the liquids;

(2) Disposing a measure adding means for each added liquid, said means comprising a control tank for controlling the level of the liquid with proper level controlling means, such as an overflow pipe, float valve, electrode detector and level switch, a measure cylinder for measuring and adding the predetermined quantity of liquid by inflowing and overflowing the liquid with the up and down movement, and an overflow level setting pipe for setting the overflow level at the measure cylinder;

(3) Operating the means for moving said measure cylinder in the set addition order and addition interval;

(4) Mixing by stirring in a mixing tank for mixing the liquids automatically; and (5) Forwarding the mixed coating solution continuously to a coating process.

BRIEF DESCRIPTION OF THE DRAWINGS

The novel features that are considered characteristic of the present invention are set forth with particularity in the appended claims. The invention, itself, however, both as to its organization and process of operation, as well as additional objects and advantages thereof, will be understood from the following description when read in connection with the accompanying drawings, in which:

DETAILED DESCRIPTION OF THE INVENTION

Figure 1:
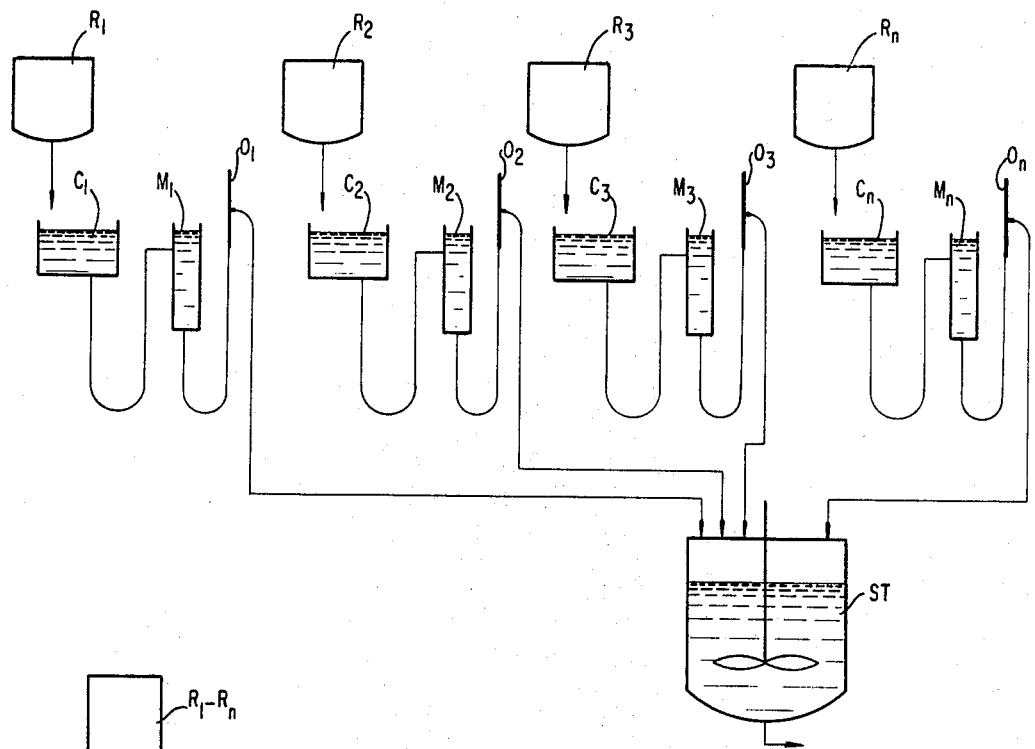
FIG. 1 is a schematic view of the manufacturing apparatus embodying the present invention.

Referring to the drawings, in FIG. 1, showing the schematic view of the embodied apparatus, the reference characters $R_1-R_n$ denote liquid supply tanks for storing the liquids and solutions, $C_1-C_n$ denote control tanks of the liquids and solutions, $M_1-M_n$ denote measure cylinders of the liquids and solutions, $O_1-O_n$ denote overflow level setting pipes, and ST denotes a coating solution mixing tank for mixing by stirring the added liquids and solutions.

Figure 2:
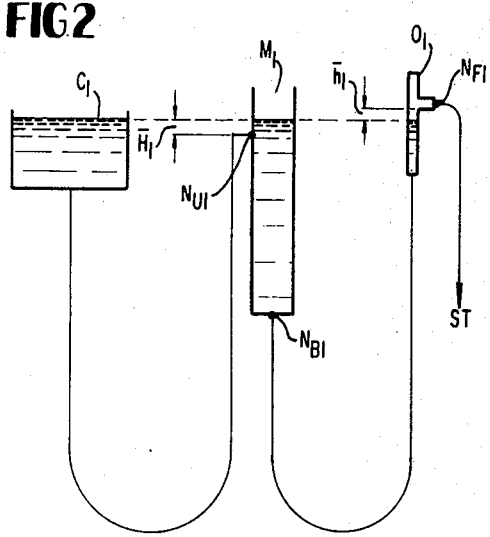
FIGS. 2, 3, 4 and 5 are schematic side views showing the operation of the main parts of the apparatus embodying the present invention.
Figure 3:
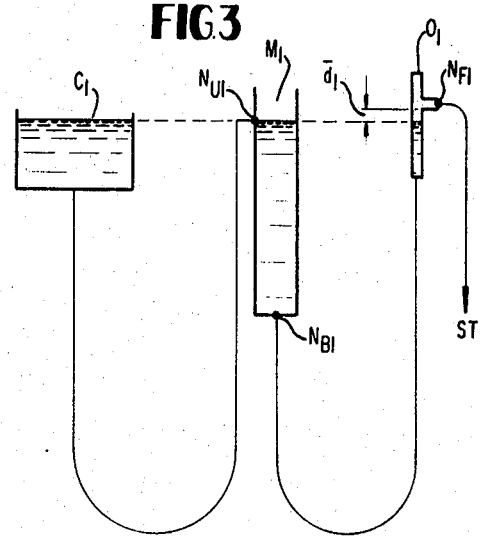
Figure 5:
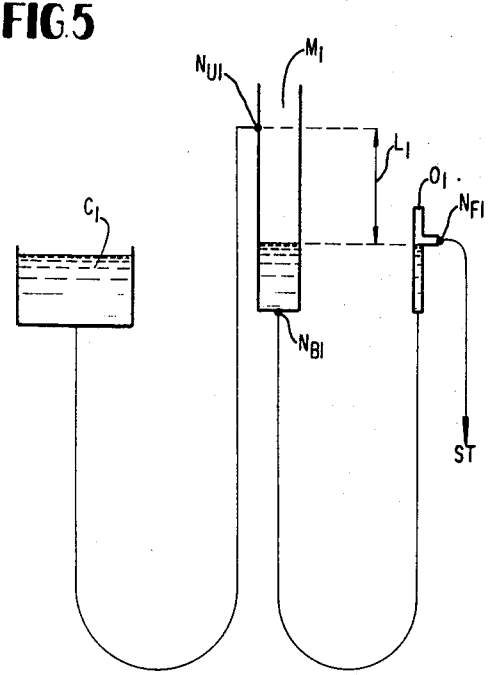
Figure 4:
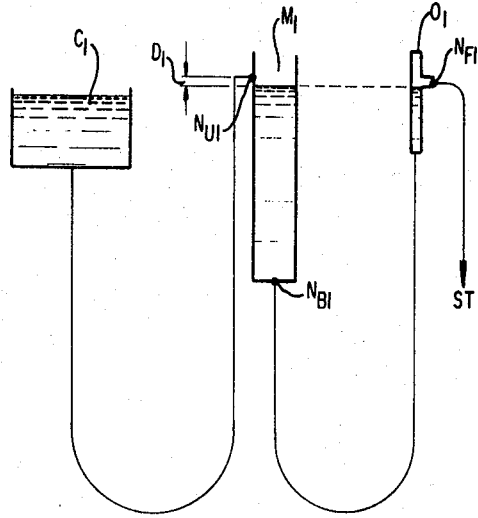

In FIGS. 2, 3, 4 and 5 showing the measuring method in accordance with the present invention, the reference characters $C_1$ denote a control tank, $M_1$ denotes a measure cylinder, $N_{U1}$ denotes a side nozzle disposed on the upper side portion of the measure cylinder $M_1$, $N_{B1}$ denotes a bottom nozzle disposed on the bottom of the measure cylinder $M_1$, $N_{F1}$ denotes an overflow nozzle disposed on the overflow level setting pipe $O_1$, $\overline{H}_1$ denotes a level difference between the level of the liquid in the control tank $C_1$ and the level of the side nozzle $N_{U1}$ of the measure cylinder $M_1$ at the lowest position of the up and down movement thereof, $\overline{h}_1$ denotes a level difference between the level of the overflow nozzle $N_{F1}$ of the overflow level setting pipe $O_1$ and the level of the liquid in the conrol tank $C_1$ at the lowest position of the up and down movement thereof, $\overline{L}_1$ denotes a level difference between the overflow nozzle $N_{F1}$ of the overflow level setting pipe $O_1$ and the side nozzle $N_{U1}$ of the measure cylinder $M_1$ at the lowest position of the up and down movement thereof, therefore the distance $\overline{H}_1+\overline{h}_1+\overline{L}_1$ is equal to the length of the up and down movement of the measure cylinder $M_1$, $\overline{d}_1$ is a level difference between the overflow nozzle $N_{F1}$ and the side nozzle $N_{U1}$ after measuring the predetermined quantity of liquid in the measure cylinder $M_1$ by moving out the excess amount of liquid in the measure cylinder $M_1$, $\overline{D}_1$ is a level difference between the overflow nozzle $N_{F1}$ and the side nozzle $N_{U1}$ when the liquid is starting to flow out through the overflow pipe $O_1$ and the overflow nozzle $N_{F1}$. FIG. 2 shows the state when the liquid finished to flow into the measure cylinder $M_1$ from the control tank $C_1$ through the side nozzle $N_{U1}$, FIG. 3 shows the state when the predetermined quantity of liquid is filled in the measure cylinder $M_1$ by moving out the excess amount of liquid in the measure cylinder $M_1$ during its up movement, FIG. 4 shows the state when the level of the liquid in the measure cylinder $M_1$ reaches the level of the overflow nozzle $N_{F1}$ and the liquid in the measure cylinder $M_1$ starts to flow out through the bottom nozzle $N_{B1}$, overflow pipe $O_1$ and overflow nozzle $N_{F1}$, and FIG. 5 shows the state when the predetermined amount of liquid finished to flow out from the measure cylinder $M_1$ to the coating solution mixing tank ST through the overflow level setting pipe $O_1$ and overflow nozzle $N_{F1}$.

Now referring to the drawings in detail, a prepared addition agent is forwarded to the measure cylinder $M_1$ from the supply tank $R_1$ through the control tank $C_1$ by the up and down movement of the measure cylinder $M_1$, and measured into a predetermined quantity by the measure cylinder $M_1$ and the overflow level setting pipe $O_1$ and added into the mixing tank ST to be stirred and mixed with the other liquids added thereto.

In this case, the regulation of the quantity to be measured is able to be carried out by varying the level of the overflow level setting pipe $O_1$, changing the measure cylinder $M_1$, and varying the upper limit of the up and down movement of the measure cylinder $M_1$.

One cycle of the measuring and adding operation in accordance with the present invention is made in the order described hereinafter.

At first, the measure cylinder $M_1$ moving up and down in the length of $\overline{H}_1+\overline{h}_1+\overline{L}_1$ is at the lowest position of the up and down movement shown in FIG. 2, and the liquid to be measured is forwarded to the level controlled control tank $C_1$ from the supply tank $R_1$, then flows into the measure cylinder $M_1$ the side nozzle $N_{U1}$ of which is positioned lower than the level of the control tank $C_1$ by level difference $\overline{H}_1$ when the measure cylinder $M_1$ is at the lowest position in the up and down movement thereof through the side nozzle $N_{U1}$ thereof until the level of the liquid in the measure cylinder $M_1$ reaches to the level of the liquid in the control tank $C_1$.

On the second step, after the liquid in the measure cylinder $M_1$ reached to the level of the liquid in the supply tank $C_1$ as shown in FIG. 2, by the above process, the measure cylinder $M_1$ starts to move upward and the excess amount of liquid in the measure cylinder $M_1$ above the side nozzle $N_{U1}$ thereof shown in FIG. 2 is flowed out and the predetermined quantity of the liquid is filled in the measure cylinder $M_1$ when the level of the liquid in the control tank $C_1$, the level of the liquid in the measure cylinder $M_1$ equals to the level of the side nozzle $N_{U1}$ of the measure cylinder $M_1$ as shown in FIG. 3. The measure cylinder $M_1$ continues to move up through the state shown in FIG. 3, and the liquid begins to overflow from the measure cylinder $M_1$ to the mixing tank ST through the bottom nozzle $N_{B1}$, the overflow level setting pipe $O_1$ and overflow nozzle $N_{F1}$, when the level of the liquid in the measure cylinder $M_1$ reaches the level of the overflow nozzle $N_{F1}$ of the overflow level setting pipe $O_1$. The liquid continues to overflow as the measure cylinder $M_1$ moves up until the level of the liquid in the measure cylinder $M_1$ reaches the level of the overflow nozzle when the measure cylinder $M_1$ reaches up to the highest position in the up and down movement thereof. After the liquid finished to overflow as shown in FIG. 5, the measure cylinder moves down and when the level of the side nozzle $N_{U1}$ becomes equal to the level of the liquid in the control tank $C_1$ the liquid begins to inflow from the control tank $C_1$ into the measure cylinder $M_1$, and the measure cylinder continues to move down up to the lowest position in the up and down movement thereof while inflowing, then the process comes back to the first step and the next cycle is prepared as shown in FIG. 2. The liquids in the tanks $R_2$, $R_3$, $R_4$, . . . $R_n$ are also added as the above liquid, whereby the liquids are continuously measured and added. In order to make the measuring and adding of the liquids smooth, the level difference $\overline{H}_1$ between the level of the liquid in the control tank $C_1$ and the level of the side nozzle $N_{U1}$ of the measure cylinder $M_1$ and the inner diameter of the flexible tube connecting the control tank $C_1$ with the side nozzle $N_{U1}$ of the measure cylinder $M_1$ are made so that the liquid flows out and in as fast as possible, for the measured liquid in the measure cylinder $M_1$ is under the level of the side nozzle $N_{U1}$ and the liquid over the level of the side nozzle $N_{F1}$ flows out into the control tank $C_1$ and others. And it is required to maintain the level of the liquid in the measure cylinder $M_1$ at the same level as the level of the overflow nozzle $N_{F1}$ of the overflow level setting pipe $O_1$ in the case of the liquid flowing out as the measure cylinder $M_1$ moves up, and the moving up speed of the measure cylinder $M_1$ should be selected with consideration so that the liquid may flow out with balance. The measured adding quantity of the liquid in the up and down motion-cycle in accordance with the present invention is represented by the following formula gained as follows. The variation of the level of the liquid in the control tank $C_1$ when the excess amount of liquid in the measured cylinder $M_1$ finished moving out is represented by $S_{M1}/\cdot \overline{H}_1$, in which $S_{C1}$ is the cross section area of the controlled portion of the control tank $C_1$, $S_{M1}$ is a cross section area of the measure cylinder $M_1$, $S_{O1}$ is the cross section area of the overflow level setting pipe $O_1$, and $\overline{H}_1$ is the level difference between the level of the liquid in the control tank $C_1$ at the lowest position in the up and down movement thereof and the level of the side nozzle $N_{U1}$ of the measure cylinder $M_1$. $\bar{a}_1$ shown in FIG. 3 is $$\frac{\left\{\overline{h}_1-\left(\frac{S_{M1}\cdot \overline{H}_1}{S_{C1}+S_{O1}}\right)\right\}\cdot S_{C1}}{S_{M1}+S_{O1}}$$

in which $\overline{h}_1$ is a level difference between the level of the liquid in the control tank $C_1$ and the level of the overflow nozzle $N_{F1}$ of the overflow level setting pipe $O_1$. Therefore, the measured adding quantity of the liquid from the measure cylinder $M_1$, that is the overflowed amount of liquid from the measure cylinder $M_1$ after the measure cylinder $M_1$ reached to the upper limit in the up and down motion thereof, is represented by the formula, $$\left[\overline{L}_1\frac{\left\{\left(\overline{h}_1-\frac{S_{M1}\cdot \overline{H}_1}{S_{C1}+S_{O1}}\right)\right\}}{S_{M1}+S_{O1}}\right]\cdot S_{M1}$$

In this case, if the liquid flowing back to the control tank $C_1$ from the measure cylinder $M_1$ flows out of the control tank $C_1$ whereby the level of the liquid is controlled to a fixed level, $$\left(\frac{S_{M1}\cdot \overline{H}_1}{S_{C1}+S_{O1}}\right)=0$$

and the overflowed quantity of liquid from the measure cylinder $M_1$, that is the measured addition liquid, is represented by the formula $$\left\{L_1-\left(\frac{\overline{h}_1\cdot S_{O1}}{S_{M1}+S_{O1}}\right)\right\}\cdot S_{M1}$$

In the case of measuring liquids with a receptacle having a definite capacity such as a measure cylinder as in the present invention, the level control error and the cross section area of the measure cylinder at the controlled level should be made small or at the effect therefrom should be made little in order to make the measure error of the capacity of the measuring receptacle small.

In the present invention, as obvious from the above relations, the effect of the variation of $\overline{H}_1$, $\overline{h}_1$ by the variations of ($\overline{H}_1+\overline{h}_1$) and the level of the liquid in the control tank $C_1$ to the variation of the quantity of liquid is much reduced by making the following relation; $S_{C1}$ $S_{M1}$, $S_{O1}$. Therefore, as the measure error of the liquids, the level difference $\overline{L}_1$ between the level of the side nozzle $N_{U1}$ of the measure cylinder $M_1$ at the highest position in the up and down movement thereof and the overflow nozzle $N_{F1}$ of the overflow level setting pipe $O_1$, the cross section of the measure cylinder $M_1$ at the level of the side nozzle $N_{U1}$, and the cross section of the measure cylinder $M_1$ at the level of the overflow nozzle $N_{F1}$ when the measure cylinder $M_1$ is at the highest position in the up and down movement thereof are essential factors.

As the liquid is intermittently supplied to the measure cylinder and added in the case of measuring in accordance with the present invention, the measuring quantity of the liquid at one cycle is able to be made large. Therefore, if the said level difference $\overline{L}_1$ is determined in consideration of the error in setting the hghest position of the up and down movement of the measure cylinder $M_1$ and the relation of the level difference $\overline{L}_1$ with the cross section area of the measure cylinder $M_1$ at the level of the overflow nozzle $N_{F1}$ thereof, the level difference $\overline{L}_1$ becomes sufficiently large and the relative error is determined only with the control error of the level difference $\overline{L}_1$ without being effected by the level control error of the control tank $C_1$, thereby making the measure relative error sufficiently small.

The capacity of the liquid in the present invention is able to be regulated as described above by regulating the up and down movement of the overflow level setting pipe, by changing the measure cylinder $M_1$ and by varying the upper limit of the up and down movement of the measure cylinder $M_1$, and also regulated by varying the level of the overflow varying the level of the overflow level setting pipe $O_1$. Therefore, particularly strict consideration of the error of the inner diameter of the measure cylinder $M_1$, the error of the fixed position of the side nozzle $N_{U1}$ to the measure cylinder $M_1$ and the error of the inner diameter of the overflow level setting pipe $O_1$ is not necessary. And the regulation of the predetermined quantity of the liquid in case of setting the quantity of the measured liquid is able to be made by varying the level of the overflow level setting pipe $O_1$ and sufficient accuracy is gained in the regulation thereby.

In the mixing process of the coating solution for manufacturing the photosensitive material, the coating solution completed by mixing the liquids together measured and added is needed to contain little coagulation made by interaction between the gelatin and addition agents on account of local unevenness of the density of the liquid, and very small bubbles made by stirring and adding, by being uniformly mixed in the mixing tank ST. If the above coagulation and small bubbles are remarkable in the coating solution, it greatly affects the quality of the photographic material and makes the uniform coating impossible in the next coating process and makes the manufacturing of the photosensitive material impossible. In the case of manufacturing the coating solution containing no coagulation and small bubbles uniformly mixed in the mixing tank ST, the factor which affects the uniformity of the liquid is an adding speed when mixing in the mixing tank ST and the stirred method of the coating compound in the mixing tank ST. As for the adding speed of the liquids in accordance with the present invention, the flowing out speed of the liquid in proportion to the moving up speed of the measure cylinder $M_1$ is gained by selecting the moving up speed of the measure cylinder $M_1$ in consideration of the balanced flowing out of the liquid in respect to the inner diameter of the flexible tube connecting the bottom nozzle $N_{B1}$ of the measure cylinder $M_1$ with the overflow level setting pipe $O_1$, and by disposing the overflow nozzle $N_{F1}$ of the overflow level setting pipe $O_1$ at the same level as the level of the liquid in the measure cylinder $M_1$, as described above. Thus, the adding speed of the liquids into the mixing tank ST is able to be set in response to the property of matter and added quantity of the liquid by regulating the moving up speed of the measure cylinder $M_1$, thereby making it possible to add the liquid without pulsation suitable for manufacturing a uniform mixed coating compound. Moreover in the present invention, it is possible to add some addition agents together at a time if the addition agents have no interaction therebetween and there is no limitation to the adding order and adding interval, and it is possible to measure and add some liquids at a time by moving the measure cylinders thereof up and down with an up and down moving mechanism, whereby the manufacturing apparatus is made simple and the care thereof is made easy. In manufacturing the photosensitive material, the mixture and the liquids should be kept in a constant temperature in order to maintain the property of the liquid emulsion gelatin solution and the completed coating solution and to prevent the gelatin thereof. Therefore, at the time of adding, the addition liquids and solutions are also needed to be kept in the same temperature as for the coating solution.

Nevertheless, there are some addition agents which cannot be kept in the same temperature as the temperature for the coating solution on account of the chemical property. Those addition agents are desired to be heated just before the adding. In the present invention, any particular heat exchange device is not needed to be disposed to the control tank by making the control tank with a jacket.

Moreover, in the present invention, as the measured quantity of the liquid is variable by moving up and down the overflow level setting pipe, an automatic manufacturing apparatus for photosensitive material appliable for wide range of kinds of material and having high accuracy in measuring can be made by coupling the manufacturing devices in accordance with the present invention with suitable automatic level setting mechanism and computer.

Figure 6:
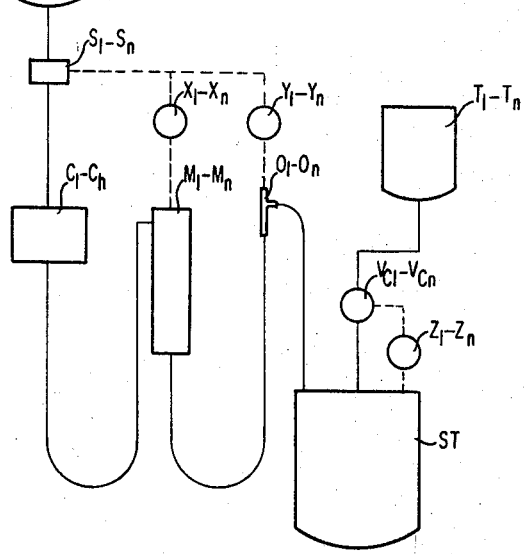
FIG. 6 is a schematic view illustrating the control system of the apparatus embodying the present invention.

FIG. 6 is a schematic view illustrating the control device adapted to be used with the apparatus embodying the present invention. In FIG. 6 the reference characters $R_1$–$R_n$ denotes the supply tanks of the liquids and solutions, $T_1$–$T_n$ denote the supply tanks of the addition liquid and solutions for regulating the property of matter, $C_1$–$C_n$ denote the control tanks of the liquid, $M_1$–$M_n$ denote the measure cylinders of the liquid, $O_1$–$O_n$ denote the overflow level setting pipes, ST denotes a mixing tank, $S_1$–$S_n$ denote the supply selecting means of the liquid, $V_{c1}$–$V_{cn}$ denote addition liquid controlling valves for regulating the property of matter, and $X_1$–$X_n$, $Y_1$–$Y_n$, $Z_1$–$Z_n$ denote the controlling devices hereinafter described in detail.

In order to operate the mixture manufacturing apparatus in accordance with the present invention in a full automatic condition, three systems of controlling devices are required. That is, one of the three is represented by the controlling device system $X_1$–$X_n$, which operates the up and down moving mechanism according to the predetermined adding order and adding interval, another of the three is represented by $Y_1$–$Y_n$ which opens and closes the supply kinds selecting means and moving up and down the overflow level setting pipe according to the predetermined instructions concerning the manufacturing condition in response to the manufactured mixture, and the other of the three is represented by the controlling device system $Z_1$–$Z_n$ which detects the variation of the controlled physical properties of the mixed coating solution and controls the physical properties operating the controlling valves $V_{c1}$–$V_{cn}$.

With the above three systems of the controlling devices, the fully automatic manufacturing of the mixture is possible, but only with the controlling device system $X_1$–$X_n$ the principal object is achieved by controlling sufficiently the density of the addition liquids and solutions and by operating the setting of the quantity to be added manually.

As in detail hereinbefore set forth, in accordance with the present invention, an automatic mixture manufacturing process is realized by which the charge of the physical properties and affection to the quality of the mixture with time in the manufacturing process is eliminated and the measure error is reduced, by the method comprising: the steps of dividing the capacity of the mixing tank into the small capacity so that the liquid in the mixing tank is not affected on the quality and physical properties thereof during the time from starting to the finishing the use thereof; disposing an addition mechanism comprising a control tank level controlled by some suitable controlling means, a measure cylinder having a side nozzle on the upper side thereof for flowing in and out and a bottom nozzle on the bottom thereof for flowing out, and an overflow level setting pipe having an overflow nozzle and connected to said control tank and said measure cylinder to each liquid, said overflow nozzle of the overflow level setting pipe being positioned higher than the level of the liquid in said control tank; moving said measure cylinder up and down according to the setting of the adding order and adding interval, in the movement the side nozzle of the measure cylinder being positioned higher than the overflow nozzle of the overflow level setting pipe when the measure cylinder is at the highest position in the up and down movement thereof and the positioned lower than the level of the liquid in the control tank when the measure cylinder is at the lowest position in the up and down movement thereof; and forwarding the mixed mixture after adding, mixing and stirring automatically to the next process.

Moreover in accordance with the present invention, by adopting the manufacturing method measuring and adding with a measuring cylinder moving up and down, many automatic valves are eliminated and liquid is measured and added with little error of level controlling, thereby a reliable and continuously operable fully automatic mixture manufacturing apparatus being realized, whereby the solution is mixed at a steady condition by the extremely few operators.

And with the simple apparatus as described above, the similar result as the completely continuous manufacturing method is gained, the change of the quality and physical properties between the liquid in the difference tank in a batch manufacturing method, and switching operation of the tanks is eliminated. The problem on the quality of the mixture in the process manufacturing a mixture required economization for increasing the productivity such as in the process of mixing a photographic material the coating speed thereof being increased, and the problem on the quality of the mixture in the process manufacturing a mixture wherein the composition proportion of the mixture varies such as the photographic material wherein the proportion of the silver halide increases accompanying the advancement thereof, are able to be solved in accordance with the present invention.

EXAMPLE 1

A coating solution for the anti-halation layer of the following composition was mixed by continuously and automatically measured and mixed using the manufacturing apparatus described hereinbefore, wherein the capacity of the tank for mixing is 10 kg., and the period for mixing in the mixing tank is 5–10 minutes:

|  | Parts |
|---|---|
| Gelatin solution | 100 |
| Dye solution | 15 |
| Coating assistant solution | 15 |
| Hardener solution | 20 |
| Water and others | 50 |

The viscosity, specific gravity, electric conductivity and color tone of the completed coating solution were measured, and the change thereof was within the standard limit.

EXAMPLE 2

A photographic emulsion for the negative emulsion layer of the following composition was mixed by continuously and automatically measured and mixed using the manufacturing apparatus described hereinbefore, wherein the capacity of the tank for mixing is 10 kg., and the period for mixing in the mixing tank is 5–10 minutes:

|  | Parts |
|---|---|
| Liquid emulsion | 100 |
| Color-sensitizer and stabilizer solution | 15 |
| Coating assistant solution | 15 |
| Hardener solution | 20 |
| Water and others | 50 |

The change of the viscosity, specific gravity, electric conductivity of the completed emulsion were continuously measured and found to be within the standard limit. The photographic characteristics of the completed emulsion was entirely uniform.

What is claimed is:

1. A method of manufacturing a mixture so that the time from the start of the manufacture to the use-finishing thereof is shorter than the allowable period for the change of the quality and physical properties of the manufactured mixture, with a control tank for controlling the level of the liquid, a measuring cylinder having at the upper side and at the bottom thereof a nozzle, an overflow level setting pipe connected thereto having an overflow nozzle comprising the steps of guiding the liquids to be mixed to the adding means where said measure cylinder is moved up and down according to the adding order and the adding interval, said measure cylinder being so moved that the nozzle disposed at the upper side portion of said measure cylinder may be positioned higher than the overflow nozzle of said overflow level setting pipe when said measure cylinder is at the highest position in the up and down movement thereof and may be positioned lower than the level of the liquid in the control tank when said measure cylinder is at the lowest position in the up and down movement thereof; measuring and adding the liquids into the mixing tank according to the predetermined order and interval; and mixing the liquids added into the mixing tank by stirring to forward the mixed mixture to the next process continuously.

References Cited

UNITED STATES PATENTS

| | | | |
|---|---|---|---|
| 2,660,190 | 11/1953 | Blondel | 259—8 X |
| 2,883,343 | 4/1959 | Favre | 259—23 X |
| 3,186,688 | 6/1965 | Michael | 259—23 |
| 3,271,241 | 9/1966 | Mumme | 259—8 X |

ROBERT W. JENKINS, Primary Examiner